US011387713B2

(12) United States Patent
Binder et al.

(10) Patent No.: US 11,387,713 B2
(45) Date of Patent: Jul. 12, 2022

(54) SLIP RING, SLIP RING UNIT, ELECTRIC MACHINE, AND WIND TURBINE

(71) Applicant: Flender GmbH, Bocholt (DE)

(72) Inventors: Herbert Binder, Neuburg (DE); Robert Gruber, Ruhstorf (DE); Oliver Memminger, Neuburg a. Inn (DE)

(73) Assignee: FLENDER GMBH, Bocholt (DE)

( * ) Notice: Subject to any disclaimer, the term of this patent is extended or adjusted under 35 U.S.C. 154(b) by 0 days.

(21) Appl. No.: 17/263,443

(22) PCT Filed: Jun. 13, 2019

(86) PCT No.: PCT/EP2019/065467
§ 371 (c)(1),
(2) Date: Jan. 26, 2021

(87) PCT Pub. No.: WO2020/020533
PCT Pub. Date: Jan. 30, 2020

(65) Prior Publication Data
US 2021/0313863 A1  Oct. 7, 2021

(30) Foreign Application Priority Data
Jul. 27, 2018  (EP) .................................... 18186107

(51) Int. Cl.
*H02K 9/28* (2006.01)
*H02K 9/10* (2006.01)
*H02K 13/00* (2006.01)

(52) U.S. Cl.
CPC ................. *H02K 9/28* (2013.01); *H02K 9/10* (2013.01); *H02K 13/003* (2013.01)

(58) Field of Classification Search
CPC .......... H02K 9/28; H02K 9/10; H02K 13/003; Y02E 10/72; H01R 39/64; H01R 39/08
(Continued)

(56) References Cited

U.S. PATENT DOCUMENTS 853,283 A * 5/1907 Waters ..................... H02K 9/28
310/227
3,784,855 A * 1/1974 Motegi .................... H02K 9/28
310/227
(Continued)

FOREIGN PATENT DOCUMENTS

CN    103795193 A    5/2014
CN    107408813 A    11/2017
(Continued)

OTHER PUBLICATIONS

PCT International Search Report and Written Opinion of International Searching Authority dated Sep. 25, 2019 corresponding to PCT International Application No. PCT/EP2019/065467 filed Jun. 13, 2019.
(Continued)

*Primary Examiner* — Ahmed Elnakib
(74) *Attorney, Agent, or Firm* — Henry M. Feiereisen LLC (57) ABSTRACT

A slip ring includes an essentially cylindrical contact region defined by a radius and having a contact region which faces in a radially outwards direction. The contact region has a recess in a region of the contact surface, with the recess configured to have a projection extending on an inner side of the recess and/or being interrupted in a tangential direction. The contact region has an annular surface formed with an opening which communicates with the recess and extends towards an axial direction at an incline at an interval of 5 degrees to 45 degrees with respect to a normal of the annular surface. At least two insulating regions are arranged axially adjacent to the contact region and each being defined by a radius, with the radius of the contact region being larger than the radius of the insulating region.

20 Claims, 5 Drawing Sheets

(58) Field of Classification Search
USPC .......................................................... 310/58
See application file for complete search history.

(56) References Cited

U.S. PATENT DOCUMENTS

| | | | | |
|---|---|---|---|---|
| 3,984,716 A | * | 10/1976 | Stark ........................ | H02K 9/28 |
| | | | | 310/232 |
| 7,481,655 B2 | * | 1/2009 | Horst ..................... | H01R 39/64 |
| | | | | 439/24 |
| 2017/0328352 A1 | | 11/2017 | Kluemper et al. | |
| 2020/0076274 A1 | | 3/2020 | Binder et al. | |

FOREIGN PATENT DOCUMENTS

| | | | |
|---|---|---|---|
| DE | 307969 C | | 1/1900 |
| DE | 496818 | * | 4/1930 |
| DE | 25 29 519 A1 | | 1/1977 |
| DE | 77 34 576 U1 | | 7/1979 |
| EP | 0052385 | * | 9/1981 |
| EP | 2887509 A1 | | 6/2015 |
| EP | 3 322 047 A1 | | 5/2018 |
| GB | 116226 | * | 6/1918 |
| GB | 2010021 A | | 6/1979 |
| WO | WO 2016/165939 A1 | | 10/2016 |
| WO | WO 2018/091215 | | 5/2018 |

OTHER PUBLICATIONS

Chinese Search Report dated Nov. 11, 2021 with respect to counterpart Chinese patent application 2019800499152.
Translation of Chinese Search Report dated Nov. 11, 2021 with respect to counterpart Chinese patent application 2019800499152.

* cited by examiner

SLIP RING, SLIP RING UNIT, ELECTRIC MACHINE, AND WIND TURBINE

CROSS-REFERENCES TO RELATED APPLICATIONS

This application is the U.S. National Stage of International Application No. PCT/EP2019/065467, filed Jun. 13, 2019, which designated the United States and has been published as International Publication No. WO 2020/020533 A1 and which claims the priority of European Patent Application, Serial No. 18186107.1, filed Jul. 27, 2018, pursuant to 35 U.S.C. 119(a)-(d).

BACKGROUND OF THE INVENTION

The Invention relates to a slip ring and a slip ring unit. The invention further relates to an electric machine and a wind turbine Generators for wind turbines at times comprise coils in the rotor and in the stator. In general, the coils in the rotor are supplied with electrical energy via slip rings.

Slip rings are exposed to high current loads, in particular during the transmission of electrical powers in the megawatt range. An intense thermal load results from these high current loads.

In order to reduce the thermal load, slip rings or slip ring units (slip ring having a matching stationary arrangement) can be embodied as larger. This is however, in particular in a wind turbine, almost impossible.

Therefore the document EP 3 322 047 A1 proposes a slip ring unit having a fan insulating segment.

The unexamined German patent DE 25 29 519 A1 relates to an air-cooled slip ring that is combined from individual annular disks that are arranged spaced from one another and passages that are arranged flush with respect to one another are included in said annular disks and said passages form cooling ducts that extend axially starting from at least one end face.

The utility model DE 77 34 576 U1 relates to a slip ring arrangement for an electric machine. The slip ring body comprises a slip ring and also a carrier ring and spacers that connect this slip ring and carrier ring. The slip ring is provided with annular or helical grooves that reach to air passage openings that are parallel to the axle.

The object of the invention is to provide a slip ring or a slip ring unit that can be embodied in a compact manner and can simultaneously transfer large quantities of electrical energy.

SUMMARY OF THE INVENTION

This object is achieved with a slip ring in accordance with the present invention and also with a slip ring unit in accordance with the present invention. Furthermore, an electric machine and a wind turbine as as set forth hereinafter achieve this object.

Advantageous embodiments and developments of the invention are the subject matter of the dependent claims.

The invention is based on the idea that an airflow is conveyed in the axial direction through openings in the slip ring and is conveyed outwards through openings out of the slip ring in the radial direction. The airflow in this case flows on the inner side of the recess of the slip ring and absorbs thermal energy. Furthermore, the radial airflow can be used so as to cool the slip ring elements. It is particularly advantageous in this case that the airflow that extends in the radial direction can cool slip ring elements particularly effectively. The airflow that extends in the radial direction is further used to cool side surfaces of the slip ring elements. The airflow that is conveyed outwards in the radial direction is preferably embodied so as to cool slip ring elements. The slip ring elements are advantageously cooled from the underside.

The slip ring elements are particularly well cooled by the airflow that extends radially outwards. The slip ring for this purpose has contact regions, wherein the contact regions in each case can be embodied in an essentially cylindrical manner and in each case have a recess on their contact surface. The contact surface is preferably arranged on the peripheral surface of the cylindrical contact region. Furthermore, the cooling of a contact region is at least indirectly improved via the cooling of the electrically conductive slip ring elements. An improved cooling of the slip ring renders it possible to provide a more compact construction type of the slip ring or the slip ring unit.

The slip ring Is used in particular so as to transmit electrical energy to a rotatably mounted axle, preferably in a wind turbine. The slip ring has at least one contact region and at least two insulating regions, wherein the insulating regions and the at least one contact region are arranged adjacent to one another in the axial direction, wherein the contact region has a contact surface at least in the direction that faces radially outwards, wherein the contact region has at least one recess in the region of the contact surface, wherein the recess has projections on the inner side
and/or the recess is interrupted in the tangential direction.

The respective insulating region is preferably produced from plastic. The respective contact region is preferably produced essentially from a metal that conducts electricity effectively, such as stainless steel, copper or bronze.

The contact region preferably has the contact surface on the peripheral surface of said contact region. Alternatively or in addition thereto, the contact surface can be arranged on an annular region of the respective end face of the contact region.

The respective recess is preferably embodied in a radially symmetrical manner and has a depth that reaches at least as far into the contact region so that the openings lead into the recess. It is preferred that the recess, at least in regions, has a width in the axial direction of a quarter to a third of the width of the contact surface. It is preferred that the recess is arranged in the axial center of the contact surface.

The projections can be embodied on the peripheral surface of the respective contact region. The projections can be embodied in one embodiment as an interruption of the recess in the tangential direction. Projections and interruptions of the respective recess preferably have the same effect, namely of providing an airflow in the radial direction. The airflow is used in particular to cool slip ring elements.

It is preferred that during the production of the slip ring the insulating regions and the contact regions are arranged one on top of the other. It is preferred that the respective contact region is at least in part covered on its respective end face by an insulating region. The in each case uncovered annular part is referred to here as an annular surface.

It Is preferred that the projections are arranged in the recess in such a manner that said projections induce an airflow in the direction that faces radially outwards during a rotational movement of the slip ring.

The slip ring preferably comprises contact elements. The contact elements are preferably arranged on an end face of the slip ring. The contact elements are preferably connected to the corresponding contact surface in an electrically conductive manner.

The contact region can be embodied in each case for the purpose of receiving electrical energy from an electrically conductive slip ring element. The electrically conductive slip ring element is embodied for example as a brush. The electrically conductive slip ring element is provided so as to transmit the electrical energy from a stationary arrangement.

The electrically conductive slip ring element can be cooled by the invention with the aid of an airflow from the side that contacts the contact region.

Furthermore, it is possible to omit a forced ventilation arrangement.

The Improved cooling renders it possible for the slip ring to be embodied as smaller and more compact and therefore lighter.

In an advantageous embodiment of the invention, the respective projection is provided so as to provide an airflow in the radial direction.

The shaped area is used during a rotational movement of the slip ring to generate the airflow in order to cool a slip ring element that transmits electrical energy to the respective contact region. As a result of the advantageous arrangement of the shaped area in the interior of the recess, the airflow extends from below to the underside and the lateral surfaces of the slip ring elements.

In a further advantageous embodiment of the invention, the respective recess is positioned in the region of the axial center of the contact surface.

The recess is preferably arranged in the region of the center or in the center of the axially extending width of the contact surface.

As an example, the recess has a width of approximately a third of the width of the contact surface.

As a result of the central arrangement of the recess, the airflow flows particularly uniformly through the recess and to the center of the respective slip ring elements. It is preferred that the slip ring elements are embodied in a two-part manner, in particular provided with a recess. Alternatively, the slip ring elements are embodied by slip ring elements that are spaced from one another. The airflow flows in this embodiment preferably between the slip ring elements.

As a consequence, the slip ring elements are accordingly cooled by the airflow flowing past on the side that in each case faces the other side. The slip ring is also accordingly cooled more efficiently as a result of the enlarged surface.

As a result of the arrangement of the recess in the center of the contact surface, it is possible to cool the contact surface and the at least one slip ring element in a particularly uniform manner.

It is preferred that a slip ring has three contact regions for three electrical phases. The contact regions are separated from one another in each case by an insulating region. In particular, an insulating region is positioned between a first contact region and a second contact region so as to space the two contact regions apart, wherein the insulating region is embodied in particular so as to electrically insulate the contact regions from one another.

The radius of the respective contact region is larger than the radius of the respective insulating region.

It is preferred that both the respective contact region and the respective insulating region are essentially embodied as cylindrical. The parts of the respective contact region, which in each case lie radially outside, are here referred to as annular surfaces.

The respective annular surface preferably has a normal vector that faces in the axial direction.

The annular surfaces are not covered owing to the embodiment of the insulating regions having a smaller radius than the contact regions and the annular surfaces can be cooled more efficiently by an airflow.

The contact region has openings, wherein the openings in each case are arranged in an annular surface, wherein the openings lead into the respective recesses.

The openings are preferably embodied in such a manner that said openings embody a duct for the airflow into the recess.

The openings are consequently used in particular for the transfer of the airflow into the interior of the recess.

It is preferred that the two annular surfaces of the respective contact region have openings. The openings are advantageously positioned in each case at the same positions of the respective annular surface. The openings extend through the contact region preferably in the axial direction. An airflow that extends in the axial direction can therefore be guided through the openings into the recess. The airflow that flows through the opening into the recess can flow out of the recess in the radial direction as a result of the connection of the opening and the recess. It is preferred that the two annular surfaces of the respective contact region are provided with openings. The openings can be positioned in this case in the same tangential positions.

The openings extend in each case at a slight incline with respect to the axial direction.

It is preferred that the openings that extend essentially axially are oriented in an inclined manner in the tangential direction. An incline of approximately 5 degrees to 45 degrees is embodied with respect to the normal of the respective annular surface. The respective opening can therefore be used so as to provide an airflow into the recess.

The annular surfaces are preferably the radially extending, annular surfaces that are embodied owing to a larger diameter of the contact region than the peripheral surface of the remaining slip ring.

In particular, openings that are embodied in a non-orthogonal manner with respect to the annular surface are used so as to improve the airflow that faces radially outwards.

The openings accordingly considerably improve the procedure of cooling the slip ring or the slip ring unit.

In a further advantageous embodiment of the invention, at least one insulating region has projections or shaped areas.

The projections or shaped areas are used preferably to generate or to support the airflow in the axial direction.

One shaped area that is arranged in an insulating region can be oriented facing inwards. Such an insulating region can be embodied as a fan.

The projections and/or shaped areas are used preferably so as to improve the cooling.

In a further advantageous embodiment of the invention, the slip ring is embodied so as to transmit an electrical power of at least 100 kilowatt, in particular 1 megawatt.

The electrical energy that is transmitted is advantageously distributed onto three contact regions. Furthermore, a plurality of electrically conductive slip ring elements can be applied to the respective contact region.

It Is advantageous to cool the slip ring and/or the slip ring unit so as to transmit such large quantities of electrical energy.

In a further advantageous embodiment of the invention, a fan is arranged at least on one side of the slip ring, wherein the fan is arranged in each case in a non-rotatable manner on the side of the slip ring.

The at least one fan can also be spaced from the slip ring fastened on the axle.

The at least one fan is used preferably so as to generate an airflow, in particular an axial airflow. The airflow preferably extends in an axial direction along the peripheral surface of the slip ring. The airflow preferably flows through the openings into the recess. The airflow is guided at least in part in the radial direction to the electrically conductive slip ring elements and/or to the stationary arrangement. The airflow in the interior of the recess is used in particular so as to cool the respective contact region.

A projection can lead to the division of a recess into a plurality of recesses that are arranged tangentially adjacent to one another. One side of the respective projection preferably forms a part of the contact surface. It is preferred that the projections are arranged in the insulating region.

It is preferred that the respective projection is embodied in such a manner that the contact region has two cover disks, wherein the respective cover disk has recessed a part of its peripheral surface and the recess is embodied by the joining together of the respective disks. In this case, the cover disks are preferably joined together in such a manner that the recess is allocated to the two cover disks.

Alternatively, it is possible for the respective cover disk not to have a recess and in each case to adjoin an end face of an intermediate layer. In this case, the intermediate layer has the at least one recess. The intermediate layer can have a peripheral surface having a smaller diameter than the cover layer, wherein the projections are preferably arranged on the peripheral surface of the intermediate layer. The respective projection can reach in regions to the diameter of the respective cover layer and therefore divide the recess into a plurality of tangentially spaced recesses.

As a result of the recess being interrupted in a tangential manner by the respective shaped area, it is possible to generate an airflow having a particularly high flow density.

The slip ring unit has a stationary arrangement for guiding and/or holding electrically conductive slip ring elements, in particular brushes, for the rotary contacting transmission of electrical energy, and an above-described slip ring, wherein at least one slip ring element is embodied so as to transmit the electrical energy to one of the contact layers of the slip ring.

The slip ring unit preferably comprises a plurality of slip ring elements that are in each case in operative contact with a contact surface or a contact region. The slip ring elements are preferably embodied as brushes. The slip ring elements are used so as to provide the electrical energy that is transmitted to the respective contact region.

The slip ring renders it possible to cool the slip ring elements in an improved manner through the recess in conjunction with the shaped areas. It is therefore possible for the slip ring unit to be constructed in a particularly compact manner.

In a further advantageous embodiment of the invention, the slip ring has contact elements, wherein the contact elements render it possible to provide an electrical connection from by way of example windings in a rotor. The contact elements are electrically connected to the respective contact region.

The electric machine is embodied in particular as a generator for a wind turbine. The electric machine has a slip ring that is described above or a slip ring unit that is described above.

It is preferred that the slip ring that is described here is used in a wind turbine, an industrial motor, or a drive for heavy industry. It is preferred that an electric machine that is described here is used as a drive in the field of mining, ship propulsion or in the field of oil production.

BRIEF DESCRIPTION OF THE DRAWING

The invention is further described and explained below with reference to figures. The features that are illustrated in the figures can be combined within the scope of the invention to form new embodiments of the invention. The embodiments that are illustrated in the figures do not limit the invention in any way. In the drawings.

DETAILED DESCRIPTION OF PREFERRED EMBODIMENTS

Figure 1:
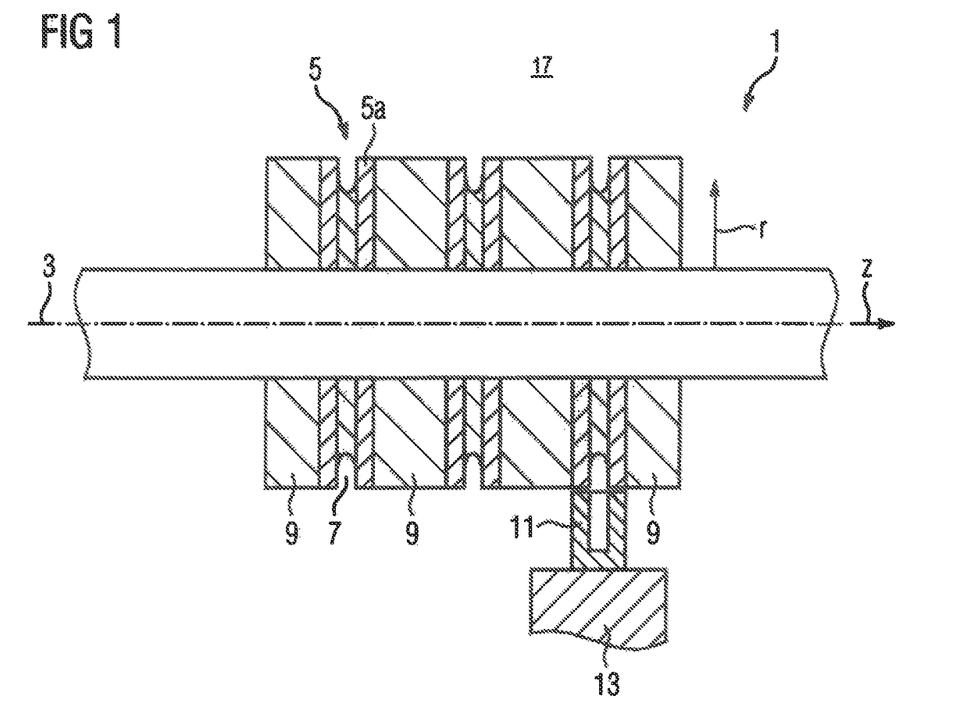
FIG. 1 shows a schematic diagram of a slip ring unit.

FIG. 1 illustrates a schematic diagram of a slip ring unit 17. The slip ring unit 17 comprises a slip ring 1, an electrically conductive slip ring element 11 and a stationary arrangement 13. The slip ring 1 is positioned on an axle 3 and is rotatably mounted with the axle 3. The slip ring 1 comprises contact regions 5 and insulating regions 9. The contact regions 5 have on their peripheral surface two contact surfaces 5a. The contact surfaces 5a of the respective contact region 5 are separated at least in regions by the recess 7. The recess 7 is arranged in the center of the respective contact region 5 in this case. Projections 8 in the respective recess 7 are not illustrated for reasons of clarity.

In the figures that are described below the reference character z refers to the axial direction, the reference character r refers to the radial direction and the reference character t refers to the tangential direction.

In the embodiment that is illustrated in this case the slip ring 1 comprises three contact regions 5 and four insulating regions 9, wherein the respective contact region 5 adjoins with its respective end face onto an insulating region 9. The contact regions 5 and the insulating regions 9 are fastened in a non-rotatable manner in the axial direction z to the axle 3.

In general, at least one slip ring element is used for each contact region 5 so as to transmit electrical energy to the contact surface 5a and therefore to the contact region. The respective slip ring element 11 is in each case positioned from a stationary arrangement so that the slip ring element 11 contacts the corresponding contact surface 5a. The slip ring element 11 in this case has a recess. The slip ring element 11 can also be embodied in a two-part manner. It is preferred that the airflow 15 also extends between the slip ring elements 11 (embodied in a two-part manner) or through the recess of the slip ring element 11.

The stationary arrangement 13 is used so as to hold the slip ring element 11. The slip ring element 11 contacts the corresponding contact region 5 during operation. The slip ring element 11 is preferably embodied as a brush and is used so as to transmit electrical energy to the slip ring.

Figure 2:
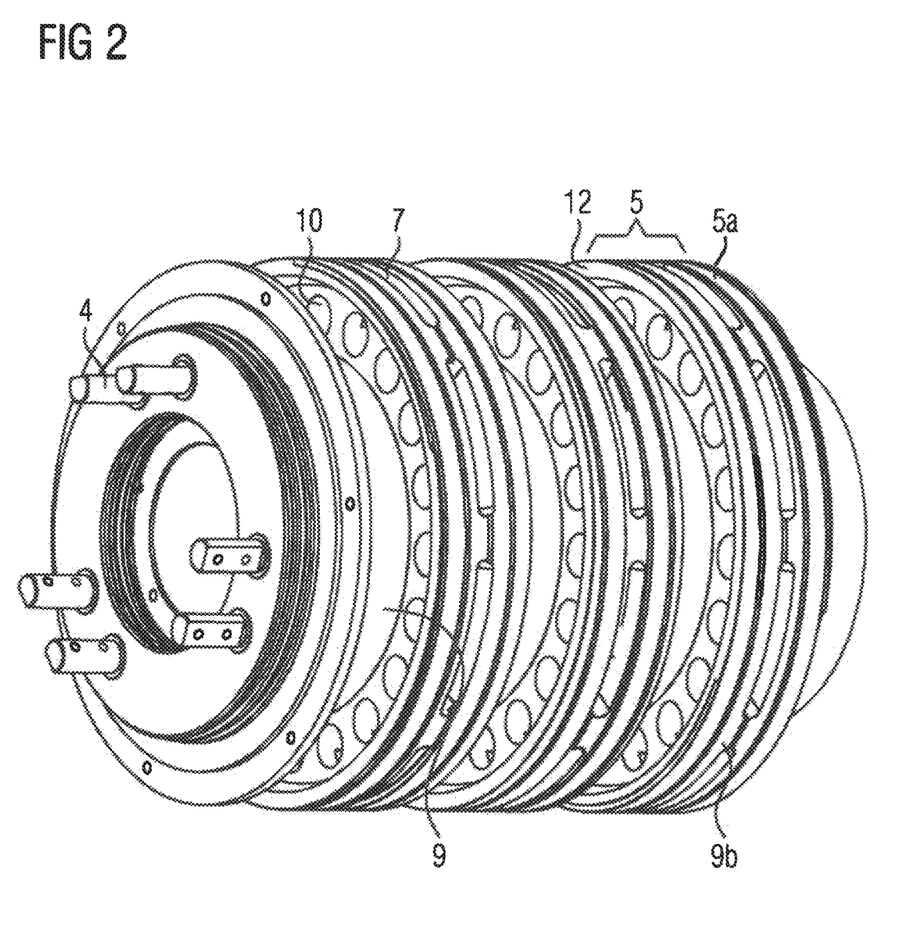
FIG. 2 shows an exemplary slip ring.

FIG. 2 illustrates an exemplary slip ring 1. The slip ring has three contact regions 5. In each case insulating regions 9 are arranged adjacent to one another in the axial direction z between the contact regions 5. The insulating layers 9 are used so as to electrically and thermally insulate the contact regions 5 from one another. The insulating layer is further used so as to stabilize the slip ring 1 so that the contact regions 5 include a defined distance with respect to one another. The contact regions 5 and the insulating regions 9 are fastened to one another in the axial direction z. The contact regions 5 have a larger radius than the insulating regions 9 so that the contact regions 5 in each case embody an annular surface 12 on the uncovered part of their end face. The annular surface 12 protrudes in the radial direction r over the peripheral surface of the respective insulating layer 9.

The annular surfaces 12 have openings 10, wherein the openings 10 embody a passage to the recesses 7. The openings 10 are arranged spaced from one another in the tangential direction t. The recesses 7 of the respective contact region 5 are interrupted. The interruptions that interrupt the recess in the tangential direction t operate like a projection 8. The respective projection 8 or the respective interruption is used so as to provide an airflow 15 in the radial direction r.

The openings 10 in the respective annular surface 12 are used so as to transfer an airflow 15 (illustrated by an arrow in FIG. 5) into the respective part of the recess 7. It is preferred that the openings 10 are positioned in such a manner that the airflow 15 can flow through the openings 10, through the contact region 5 and the recess 7. In this respect, the openings 10 are preferably not arranged offset in the tangential direction t.

The slip ring 1 has contact elements 4 on an end face. The contact elements are electrically connected to the respective contact region 5. The electrical connection preferably leads through the insulating region 9.

Figure 3:
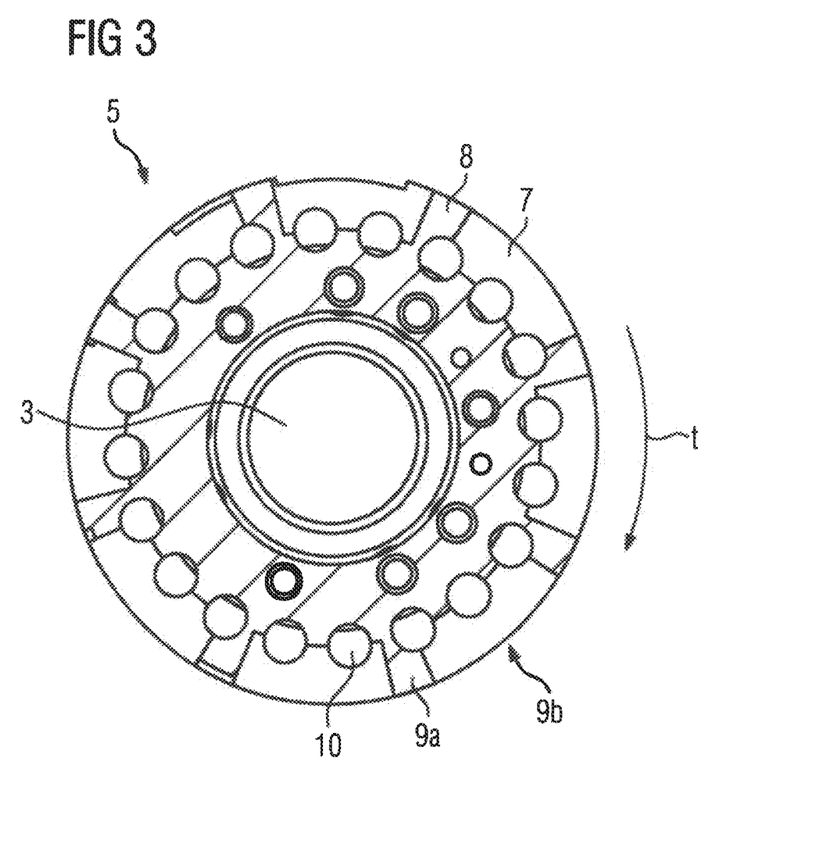
FIG. 3 shows a contact region having recesses.

FIG. 3 illustrates a contact region 5 having recesses 7. The contact region 5 comprises an intermediate layer 9a that is illustrated in a shaded manner. Furthermore, FIG. 3 indicates a covering layer 9b. The intermediate layer 9a comprises recesses 7 in the tangential direction t. Projections 8 or interruptions 8 are used so as to interrupt the recess 7 in the tangential direction t. The intermediate layer 9a and the respective covering layer 9b are embodied at least in regions to a large extent as cylindrical. In general, the respective covering layer 9b comprises a round peripheral surface, wherein the round concentric property of the covering layer only has one deviation. The contact surface 5a is positioned on the peripheral surface of the covering layer 9b. The illustrated openings 10 are used so as to transfer an airflow 15 into the respective part of the recess 7 of the contact region 5 so that an airflow 15 in the radial direction r cools the (not illustrated) electrically conductive slip ring elements 11 during the rotational movement of the slip ring 1. Circles are indicated for implementing the contact elements 4 between the openings 10 and the axle 3.

A covering layer 9b is applied to the respective end face of the shaded illustrated intermediate layer 9a in each case, wherein the covering layer 9b has the openings 10 on its side surfaces 12. The two covering layers 9b form the annular surface 12 in the region in which the insulating region 9 is not applied to said covering layers.

Alternatively, the contact region 5 can be embodied from one piece. It is preferred that the recesses 7 are then incorporated into the peripheral surface by means of a machining method, for example milling.

Figure 4:
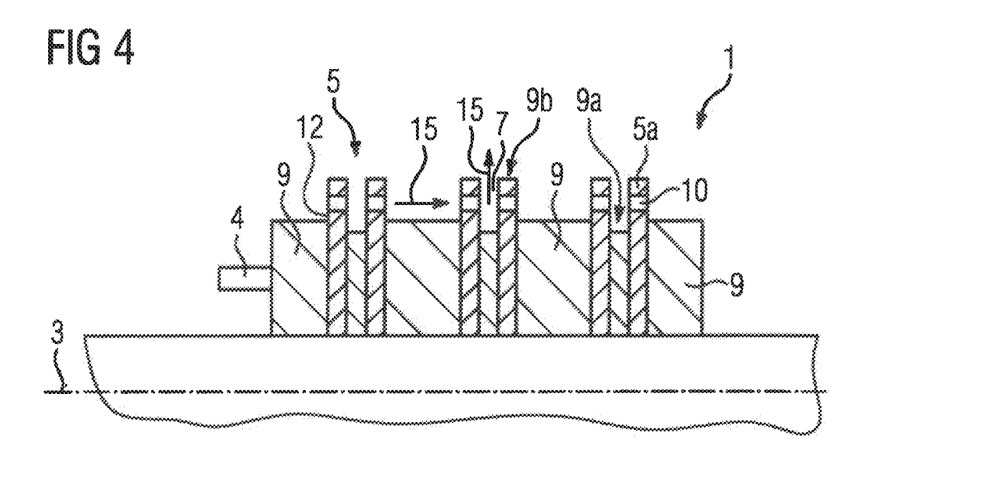
FIG. 4 shows a sectional view of a possible slip ring.

FIG. 4 illustrates a sectional view of a possible slip ring 1. A section of the axle 3 is illustrated on the underside. The slip ring 1 comprises four insulating regions 9, wherein the respective insulating region 9 is used so as to space and insulate the respective contact region 5. In the illustrated embodiment, the respective contact region 5 comprises in each case an intermediate layer 9a and two covering layers 9b. In the sectional view, it becomes clear that the intermediate layer 9a in each case protrudes beyond the respective insulating region 9 and embodies the annular surface 12 on the end surface. The annular surface 12 has the openings 10 spaced in the tangential direction t. The respective opening 10 of the two covering layers 9b are preferably arranged so that they embody a throughgoing duct for the airflow 15. The peripheral surface of the respective covering layer 9b forms the contact surface 5a. A slip ring element 11 can be applied to the contact surfaces 5a that are in each case only separated by the intermediate layer 9b.

Figure 4A:
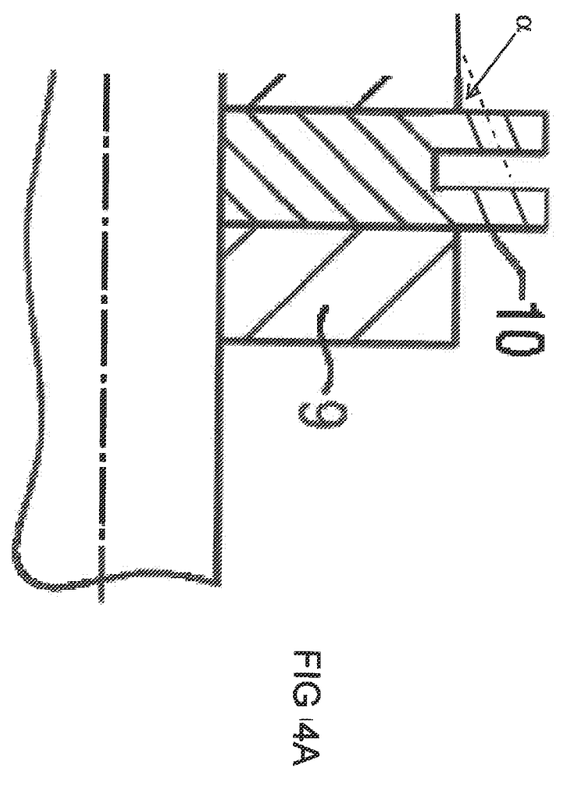
FIG. 4A shows a sectional view of a detail of a possible slip ring, illustrating the inclined openings.

FIG. 4A illustrates a sectional view of a detail of slip ring 1, showing openings 10 which are inclined by an angle α between 5 degrees to 45 degrees towards the axial direction.

The projections 8 can be arranged on the peripheral surface of the respective insulating region 9. Alternatively, projections 8 can be arranged in the respective recess.

Alternatively, the respective contact region 5 is embodied as solid or as a single part. Such a single-part embodiment omits the division of the contact region 5 into an intermediate layer 9a and the covering layers 9b.

Figure 5:
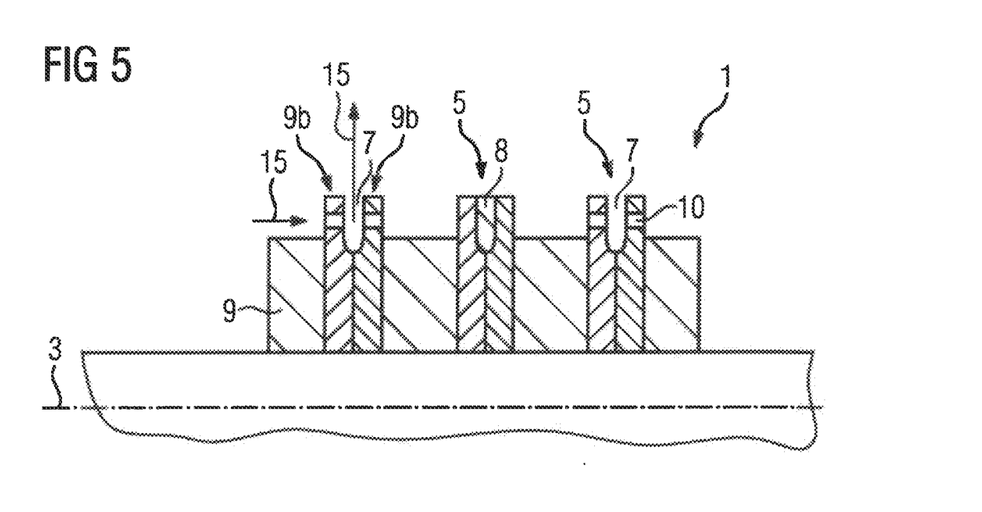
FIG. 5 shows a further sectional view, and also

FIG. 5 illustrates a further sectional view. A further exemplary slip ring 1 is illustrated on an axle 3. The respective contact region 5 in this case comprises two covering layers 9b in each case. The covering layers 9b form the recess 7 as a result of their shape. Two covering layers 9b are arranged in the center and as a result of the shaped area 8 that is illustrated said covering layers do not embody a recess 7 at the illustrated position in the tangential direction t. The contact surface 5a in this position comprises the peripheral surface of the two covering layers 9b. It is preferred that openings 10 are not provided in the annular surfaces 12 of the respective covering layer 9b in the tangential position where the covering layers 9b do not embody a recess 7.

Figure 6:
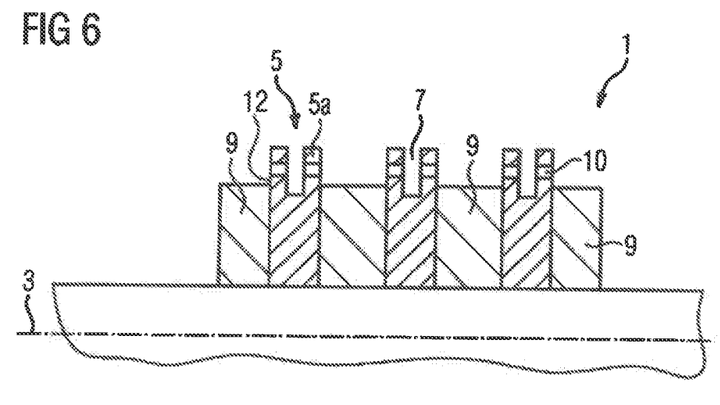
FIG. 6 shows a further sectional view.

FIG. 6 illustrates a further sectional view. In comparison to the illustrations in FIG. 4 and FIG. 5, the respective contact region 5 is embodied as a single part. It is preferred that the contact region 5 is produced from one piece, in particular with the aid of a lathe machine.

In summary, the invention relates to a slip ring 1, a slip ring unit 17 and an electric machine having such a slip ring 1. The slip ring 1 is used so as to transmit electrical energy from a stationary unit 13 via an electrically conductive slip ring element 11 to a contact region 5. The contact region 5 has at least one recess 7 in the tangential direction t. The recess 7 or insulating layers 9 that are arranged between the contact regions 5 have at least one projection 8, wherein the projections 8, in particular during a rotational movement of the slip ring 1, provide an airflow 15 for cooling the contact region 5 and/or the slip ring element 11. In order to improve the airflow 15, openings 10 are incorporated into annular surfaces 12 that are formed as a result of an enlarged radius of the contact region 5 in comparison to the adjacently arranged insulating regions 9. The openings 10 are used preferably so as to transfer the airflow 15 into the respective recess 7. It is possible as a result of the features of the invention to transmit large quantities of electrical energy with a compact construction of the slip ring 1. The slip ring 1 is therefore suitable in particular for use in a wind turbine.

The invention claimed is:

1. A slip ring, of an electric machine, comprising:
   an essentially cylindrical contact region defined by a radius and having a contact surface which faces in a radially outwards direction, said contact region having a recess in a region of the contact surface, said recess configured to have a projection extending on an inner side of the recess and/or being interrupted in a tangential direction, said contact region having an annular surface formed with an opening which communicates with the recess and is inclined towards an axial direction at an angle between 5 degrees to 45 degrees; and at least two insulating regions arranged axially adjacent to the contact region and each being defined by a radius, with the radius of the contact region being larger than the radius of the insulating region.

2. The slip ring of claim 1, wherein the projection is configured to guide an airflow in a radial direction.

3. The slip ring of claim 1, wherein the recess is positioned in a region of an axial center of the contact surface.

4. The slip ring of claim 1, wherein one of the at least two insulating regions comprises a shaped area or a projection.

5. The slip ring of claim 1, wherein the contact region comprises at least two contact layers having surfaces that face towards one another axially and each having one of said recess to reducing a size of the contact surface.

6. The slip ring of claim 1, configured to transmit an electrical power of at least 100 kilowatt.

7. The slip ring of claim 1, wherein the slip ring is configured for a rotor having windings.

8. The slip ring of claim 1, wherein the electric machine is a wind turbine.

9. The slip ring of claim 1, configured to transmit an electrical power of at least 1 megawatt.

10. A slip ring unit, comprising:
a slip ring comprising an essentially cylindrical contact region defined by a radius and having a contact surface which faces in a radially outwards direction, said contact region having a recess in a region of the contact surface, said recess configured to have a projection extending on an inner side of the recess and/or being interrupted in a tangential direction, said contact region having an annular surface formed with an opening which communicates with the recess and is inclined towards an axial direction at an angle between 5 degrees to 45 degrees, and at least two insulating regions arranged axially adjacent to the contact region and each being defined by a radius, with the radius of the contact region being larger than the radius of the insulating region;
an electrically conductive slip ring element for a rotary contacting transmission of electrical energy, said slip ring element transmitting the electrical energy to the contact region of the slip ring; and
a stationary arrangement configured to guide and/or hold the electrically conductive slip ring element.

11. The slip ring unit of claim 10, wherein the projection is configured to guide an airflow in a radial direction.

12. The slip ring unit of claim 10, wherein the recess is positioned in a region of an axial center of the contact surface.

13. The slip ring unit of claim 10, wherein one of the at least two insulating regions comprises a shaped area or a projection.

14. The slip ring unit of claim 10, wherein the contact region comprises at least two contact layers having surfaces that face towards one another axially and each having one of said recess to reducing a size of the contact surface.

15. The slip ring unit of claim 10, wherein the slip ring is configured to transmit an electrical power of at least 100 kilowatt.

16. An electric machine, comprising:
a slip ring comprising an essentially cylindrical contact region defined by a radius and having a contact surface which faces in a radially outwards direction, said contact region having a recess in a region of the contact surface, said recess configured to have a projection extending on an inner side of the recess and/or being interrupted in a tangential direction, said contact region having an annular surface formed with an opening which communicates with the recess and is inclined towards an axial direction at an angle between 5 degrees to 45 degrees, and at least two insulating regions arranged axially adjacent to the contact region and each being defined by a radius, with the radius of the contact region being larger than the radius of the insulating region; or
a slip ring unit as set forth in claim 10.

17. The electric machine of claim 16, constructed as a generator for wind turbine.

18. A wind turbine, comprising an electric machine, said electric machine comprising a slip ring comprising an essentially cylindrical contact region defined by a radius and having a contact surface which faces in a radially outwards direction, said contact region having a recess in a region of the contact surface, said recess configured to have a projection extending on an inner side of the recess and/or being interrupted in a tangential direction, said contact region having an annular surface formed with an opening which communicates with the recess and is inclined towards an axial direction at an angle between 5 degrees to 45 degrees, and at least two insulating regions arranged axially adjacent to the contact region and each being defined by a radius, with the radius of the contact region being larger than the radius of the insulating region, or a slip ring unit as set forth in claim 10.

19. The slip ring of claim 10, wherein the electrically conductive slip ring element is constructed as a brush.

20. The slip ring of claim 10, configured to transmit an electrical power of at least 1 megawatt.

* * * * *